(12) United States Patent
Kim

(10) Patent No.: US 11,429,425 B2
(45) Date of Patent: Aug. 30, 2022

(54) ELECTRONIC DEVICE AND DISPLAY AND CONTROL METHOD THEREOF TO PROVIDE DISPLAY BASED ON OPERATING SYSTEM

(71) Applicant: Samsung Electronics Co., Ltd., Suwon-si (KR)

(72) Inventor: Hak-Young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 16/464,940

(22) PCT Filed: Dec. 22, 2017

(86) PCT No.: PCT/KR2017/015300
§ 371 (c)(1),
(2) Date: May 29, 2019

(87) PCT Pub. No.: WO2018/117719
PCT Pub. Date: Jun. 28, 2018

(65) Prior Publication Data
US 2020/0019431 A1    Jan. 16, 2020

(30) Foreign Application Priority Data
Dec. 23, 2016 (KR) .................. 10-2016-0178255

(51) Int. Cl.
*G06F 9/48* (2006.01)
*G06F 3/14* (2006.01)

(52) U.S. Cl.
CPC .............. *G06F 9/48* (2013.01); *G06F 3/1423* (2013.01); *G06F 2209/482* (2013.01)

(58) Field of Classification Search
None
See application file for complete search history.

(56) References Cited

U.S. PATENT DOCUMENTS 7,069,519 B1    6/2006 Okude et al.
8,612,740 B2 *  12/2013 Lee .................. G06F 9/45558
715/764

(Continued)

FOREIGN PATENT DOCUMENTS

JP    4492618 B2    6/2010
JP    2015-076770 A    4/2015

(Continued)

*Primary Examiner* — Hiren P Patel
(74) *Attorney, Agent, or Firm* — Jefferson IP Law, LLP

(57) ABSTRACT

The present invention relates to an electronic device and a control method thereof, wherein the electronic device is disposed in a transportation means, and can transmit, to a terminal apparatus connected thereto, screens which are respectively provided by multiple operating systems installed in the electronic device. The electronic device comprises: a communication unit for communicating with a terminal apparatus; a memory for storing multiple operating systems; and a processor for, when a user command is received from the terminal apparatus, controlling the communication unit to transmit a screen which is provided by an operating system selected according to the user command among the multiple operating systems, to the terminal apparatus.

9 Claims, 6 Drawing Sheets

(56) References Cited

U.S. PATENT DOCUMENTS

| | | |
|---|---|---|
| 9,026,307 B2 | 5/2015 | Okamoto et al. |
| 9,086,897 B2 | 7/2015 | Oh et al. |
| 9,144,094 B2 | 9/2015 | Bhamidipati et al. |
| 9,294,798 B2 | 3/2016 | Sim |
| 9,324,234 B2 * | 4/2016 | Ricci ................ G07C 5/006 |
| 9,348,555 B2 | 5/2016 | Scholz et al. |
| 9,389,752 B2 * | 7/2016 | Higuchi ........... G06F 3/04817 |
| 9,408,244 B2 | 8/2016 | Ji |
| 9,710,148 B2 * | 7/2017 | Lee ................ H04M 1/72403 |
| 10,308,117 B2 * | 6/2019 | Kim ..................... B60W 50/14 |
| 10,387,192 B2 * | 8/2019 | Kim ..................... B60R 16/02 |
| 10,481,917 B2 * | 11/2019 | Choi ................. G06F 9/4418 |
| 10,817,315 B1 * | 10/2020 | Chanda .............. G06F 9/451 |
| 10,817,332 B2 * | 10/2020 | Jeong ............... G06F 9/4856 |
| 11,225,143 B2 * | 1/2022 | Mittag ................. B60K 37/06 |
| 2007/0162901 A1 * | 7/2007 | Oh ................... G06F 9/45558 |
| | | 717/148 |
| 2010/0070106 A1 * | 3/2010 | Okamoto ........... G06F 15/163 |
| | | 701/1 |
| 2011/0227843 A1 * | 9/2011 | Wang ................. B60R 25/00 |
| | | 345/173 |
| 2012/0081380 A1 * | 4/2012 | Reeves ............... G06F 9/544 |
| | | 345/541 |
| 2012/0150992 A1 * | 6/2012 | Mays ................. G06F 9/451 |
| | | 709/217 |
| 2013/0127905 A1 * | 5/2013 | Zhang ................. G09G 5/12 |
| | | 345/629 |
| 2013/0167159 A1 * | 6/2013 | Ricci ................. G06F 11/328 |
| | | 719/319 |
| 2014/0143784 A1 * | 5/2014 | Mistry ................. G06F 1/163 |
| | | 718/102 |
| 2014/0258450 A1 * | 9/2014 | Suryanarayanan ..... H04L 47/70 |
| | | 709/217 |
| 2014/0365125 A1 * | 12/2014 | Vulcano ............ G01C 21/3682 |
| | | 701/538 |
| 2015/0073651 A1 | 3/2015 | Nagara et al. |
| 2015/0145750 A1 | 5/2015 | Shin |
| 2015/0181274 A1 * | 6/2015 | Sim ..................... H04N 21/643 |
| | | 725/75 |
| 2015/0194084 A1 * | 7/2015 | Lee .................... G06F 3/14 |
| | | 345/2.3 |
| 2016/0065690 A1 * | 3/2016 | Hanyu ................ H04L 67/303 |
| | | 715/746 |
| 2016/0261471 A1 * | 9/2016 | Arora ................. H04L 43/045 |
| 2016/0328241 A1 * | 11/2016 | Song ................. G06F 9/4403 |
| 2017/0116052 A1 * | 4/2017 | Yoo ................... G06F 9/542 |
| 2018/0060253 A1 * | 3/2018 | Gao ..................... B60K 35/00 |
| 2018/0189098 A1 | 7/2018 | Kim et al. |
| 2018/0208060 A1 * | 7/2018 | Kim ..................... B60W 50/14 |

FOREIGN PATENT DOCUMENTS

| | | |
|---|---|---|
| KR | 10-2007-0005771 A | 1/2007 |
| KR | 10-2013-0034892 A | 4/2013 |
| KR | 10-1308019 B1 | 9/2013 |
| KR | 10-2014-0122956 A | 10/2014 |
| KR | 10-1507919 B1 | 4/2015 |
| KR | 10-2015-0060370 A | 6/2015 |
| KR | 10-2015-0074542 A | 7/2015 |
| KR | 10-1552308 B1 | 9/2015 |
| KR | 10-2015-0120607 A | 10/2015 |
| KR | 10-2016-0071071 A | 6/2016 |
| KR | 10-1641489 B1 | 7/2016 |

* cited by examiner

ELECTRONIC DEVICE AND DISPLAY AND CONTROL METHOD THEREOF TO PROVIDE DISPLAY BASED ON OPERATING SYSTEM

TECHNICAL FIELD

The disclosure relates to an electronic device and a control method thereof, and more particularly, to an electronic device that is capable of operating multiple operating systems and a control method thereof.

BACKGROUND ART

Recently, with the development of electronic technologies, vehicles came to provide various functions to users riding vehicles.

Meanwhile, in order to be provided with such functions, users need to manipulate buttons, etc. installed on vehicles, but there is a problem that such manipulation interferes with driving. In particular, there is a problem that, if a driver driving a vehicle performs such manipulation while driving, an accident and the like may be caused.

DISCLOSURE

Technical Problem

The disclosure is for addressing the aforementioned need, and the purpose of the disclosure is providing an electronic device that is capable of transmitting a screen provided by each of multiple operating systems installed on the electronic device disposed in a transportation means to a terminal apparatus connected to the electronic device, and a control method thereof.

Technical Solution

An electronic device disposed in a transportation means according to an embodiment of the disclosure for achieving the aforementioned purpose includes a communication unit for communicating with a terminal apparatus, a memory storing multiple operating systems, and a processor configured to, based on a user command being received from the terminal apparatus, control the communication unit to transmit a screen which is provided by an operating system selected according to the user command among the multiple operating systems, to the terminal apparatus.

Here, the processor may operate the multiple operating systems, and display a screen provided by a first operating system among the multiple operating systems on a display.

Also, in case an operating system selected according to the user command is the first operating system, the processor may transmit the screen provided by the first operating system to the terminal apparatus.

Further, in case a second operating system different from the first operating system is selected according to the user command, the processor may transmit a screen provided by the second operating system to the terminal apparatus while the screen provided by the first operating system is being displayed on the display.

Meanwhile, the processor may execute the application in the selected operating system based on a user command received from the terminal apparatus, and control the communication unit to transmit a screen provided by the executed application to the terminal apparatus.

Here, the processor may output audio provided by the executed application through a speaker.

Meanwhile, the multiple operating systems may include a real-time operating system (RTOS) and a general purpose operating system (GPOS).

Meanwhile, a method for controlling an electronic device disposed in a transportation means according to an embodiment of the disclosure includes the steps of receiving a user command from a terminal apparatus, and transmitting a screen, which is provided by an operating system selected according to the user command among multiple operating systems, to the terminal apparatus.

Here, the method for controlling an electronic device may further include the step of operating the multiple operating systems, and displaying a screen provided by a first operating system among the multiple operating systems on a display.

Meanwhile, in the step of transmitting, in case an operating system selected according to the user command is the first operating system, the screen provided by the first operating system may be transmitted to the terminal apparatus.

Also, in the step of transmitting, in case a second operating system different from the first operating system is selected according to the user command, a screen provided by the second operating system may be transmitted to the terminal apparatus while the screen provided by the first operating system is being displayed on the display.

Meanwhile, the method for controlling an electronic device may further include the step of executing the application in the selected operating system based on a user command received from the terminal apparatus, and transmitting a screen provided by the executed application to the terminal apparatus.

Here, the method for controlling an electronic device may further include the step of outputting audio provided by the executed application through a speaker.

Meanwhile, the multiple operating systems may include a real-time operating system (RTOS) and a general purpose operating system (GPOS).

Advantageous Effects

According to the various embodiments of the disclosure as described above, even in a situation where it is difficult for a driver to control peripheral devices of a vehicle due to driving, a fellow passenger riding the vehicle can control an operating system installed on the vehicle through a terminal apparatus without interfering with the driver. Accordingly, convenience and safety can be increased. Also, not only an operating system that provides a screen currently displayed on a display of the vehicle, but also other operating systems can be controlled, and thus various contents can be provided.

BEST MODE FOR IMPLEMENTING THE DISCLOSURE

Mode for Implementing the Disclosure

Figure 1:
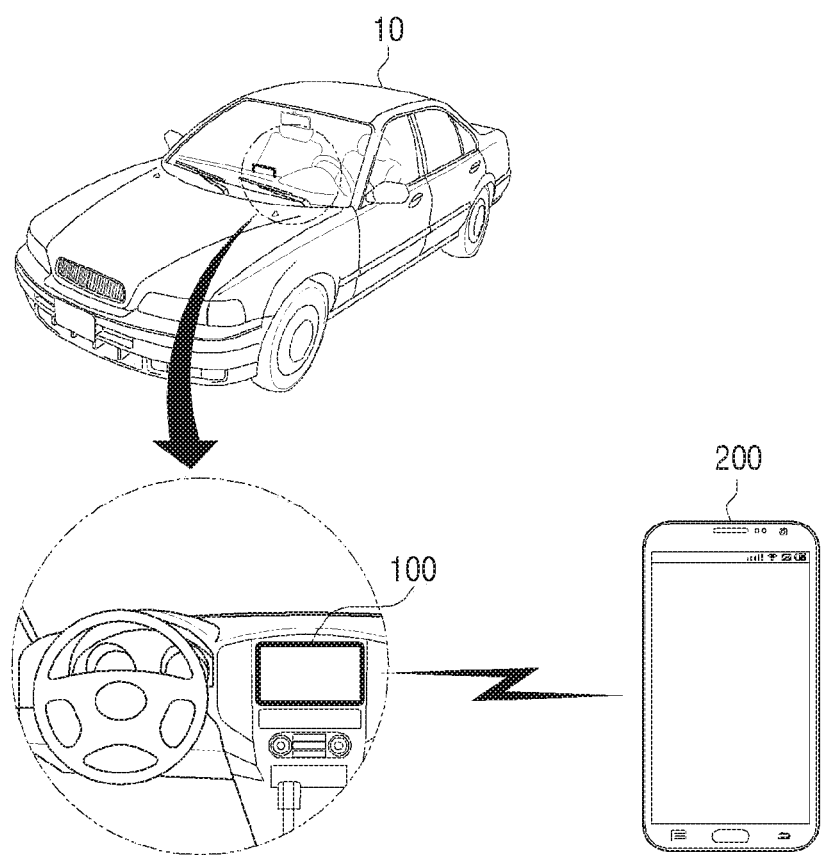
FIG. 1 is a diagram for illustrating a system according to an embodiment of the disclosure.

Hereinafter, the disclosure will be described in more detail with reference to the accompanying drawings.

As terms used in the disclosure, general terms that are currently used widely were selected as far as possible, in consideration of the functions described in the disclosure. However, the terms may vary depending on the intention of those skilled in the art who work in the pertinent field, court decisions or emergence of new technologies. Also, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Also, throughout this specification, the description that a part 'includes' a component is not intended to denote that other components are excluded, but that other components may be further included, unless there is any specific description meaning the contrary. In addition, the terms such as ' . . . unit,' 'a module,' etc. described in this specification mean units processing at least one function or operation, and they may be implemented as hardware or software, or a combination of hardware and software.

In the disclosure, transportation means refer to transportation means which people ride or freight is loaded on and can move, and as examples of transportation means, there may be vehicles, airplanes, motorcycles, (electric) bicycles, electric wheels, ships, or trains. Also, in case a transportation means refers to a vehicle, the vehicle may include a small-size vehicle, a mid-size vehicle, a full-size vehicle, a two-wheeled vehicle, and a special vehicle, and it may also include a passenger vehicle, a van, a truck, a bus, and a freight vehicle, and the like. Meanwhile, a user in the disclosure refers to a person who rides a transportation means and uses an electronic device, and for example, a user may be a person who drives or manipulates a transportation means such as a driver, a manipulator, an engineer, or a navigator, and the like, or a fellow passenger riding a transportation means.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

FIG. 1 is a diagram for illustrating a system according to an embodiment of the disclosure.

Referring to FIG. 1, a system according to an embodiment of the disclosure includes an electronic device 100 and a terminal apparatus 200.

The electronic device 100 may be mounted on a transportation means 10. In this case, the electronic device 100 may be a separate system provided on the transportation means 10, or an auxiliary system like an advanced driver assist system (ADAS), or a portion of such an auxiliary system. Also, the electronic device 100 may be a control device like an electronic control unit (ECU) that electronically controls various functions, etc. related to driving of the transportation means 10, or a portion of such a control device.

In addition, in case the electronic device 100 is implemented as an external device installed on the transportation means 10, the electronic device 100 may be implemented as a smartphone, a tablet personal computer (PC), a personal digital assistant (PDA), or a portable multimedia player (PMP), etc., or a portion of such devices. Also, the electronic device 100 may be implemented as an auxiliary device for driving such as an on board diagnostics (OBD) connected to a connector for a vehicle (e.g.: an OBD terminal or an OBD connector, etc.), navigation, and the like, or a portion of such devices.

Meanwhile, separately from the electronic device 100, the terminal apparatus 200 may be an apparatus that is installed on the transportation means 10, or an apparatus that a user riding the transportation means 10 carries. Such a terminal apparatus 200 may be implemented as a smartphone, a tablet PC, a wearable device, a PDA, or a PMP, and the like, or a portion of such devices.

However, according to the various embodiments of the disclosure, the electronic device 100 and the terminal apparatus 200 are not limited to the aforementioned devices.

The terminal apparatus 200 may perform communication with the electronic device 100, and control multiple operating systems (OSs) installed on the electronic device 100. More detailed description in this regard will be made below.

Figure 2:
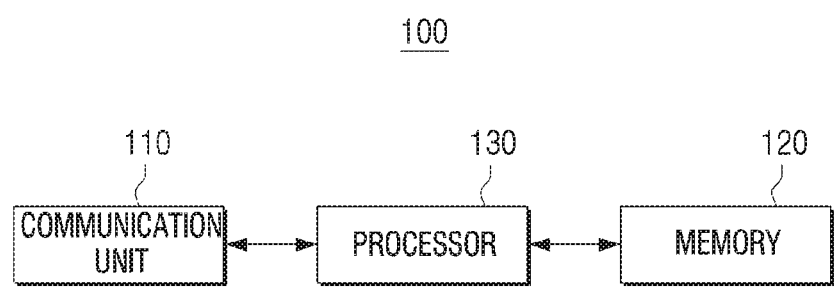
FIG. 2 is a block diagram schematically illustrating a configuration of an electronic device according to an embodiment of the disclosure.

FIG. 2 is a block diagram schematically illustrating a configuration of an electronic device according to an embodiment of the disclosure.

Referring to FIG. 2, the electronic device 100 includes a communication unit 110, a memory 120, and a processor 130.

The communication unit 110 performs communication with the terminal apparatus 200. Specifically, the communication unit 110 may perform communication with the terminal apparatus 200 by using a near field communication module.

For example, the communication unit 110 may perform communication with the terminal apparatus 200 according to a communication standard such as Wi-Fi, Bluetooth, near field communication (NFC), Zigbee, Picocast, and the like.

The memory 120 stores various data necessary for operations of the electronic device 100.

First, the memory 120 stores multiple operating systems. That is, on the electronic device 100, multiple operating systems may be installed and operated.

Here, the multiple operating systems may include a real-time operating system (RTOS) and a general purpose operating system (GPOS).

An RTOS is an operating system for execution of tasks having a real time property, and a GPOS is an operating system for execution of tasks related to multimedia services like a video and audio, and as an example, it may include Tizen, Android, Window, etc.

Further, the memory 120 may store applications (or, application programs) executed in each operating system.

Specifically, an RTOS may execute applications that are capable of acquiring information on the transportation means 10 (e.g., the driving speed, the driving direction, the states of the fuel/battery, the internal/external temperatures, etc.) in real time, and using the information, such as a navigation program, a black box program, an air conditioner control program, etc. Meanwhile, a GPOS may execute applications that are capable of providing multimedia services like a video and audio, such as a video reproduction program, a music reproduction program, etc. The memory 120 may store applications executed in each of an RTOS and a GPOS.

However, this is merely an example, and an RTOS and a GPOS may operate various applications according to the characteristics of each operating system, and the memory 120 may store various applications that can be operated by each of an RTOS and a GPOS.

In addition, the memory 120 may store a virtual machine monitor (VMM) for operating multiple operating systems simultaneously, for example, a hypervisor.

Here, a hypervisor means software that controls access methods of different operating systems for resources such as a processor and a memory. That is, a hypervisor is software that enables operation of multiple operating systems in one system, and is a virtualization engine used in layers between hardware and operating systems.

Further, the memory 120 may store programs for processing or control of the processor 130, and data for operations of the electronic device 100 such as instructions.

For this, the memory 120 may include, for example, an internal memory or an external memory.

An internal memory may include, for example, at least one of volatile memory (e.g., dynamic RAM (DRAM), static RAM (SRAM), or synchronous dynamic RAM (SDRAM), etc.) or non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD)).

An external memory may further include a flash drive, for example, compact flash (CF), secure digital (SD), micro secure digital (Micro-SD), mini-secure digital (Mini-SD), extreme digital (xD), a multi-media card (MMC), or a memory stick, etc.

Meanwhile, programs stored in the memory may be implemented as software, firmware, hardware, or a combination of at least two of them.

The processor 130 controls the overall operations of the electronic device 100.

First, the processor 130 may control the communication unit 110 to perform communication with the terminal apparatus 200. Accordingly, for example, the communication unit 110 may perform communication with the terminal apparatus 200 according to a communication standard such as Wi-Fi, Bluetooth, NFC, Zigbee, Picocast, and the like.

In this case, the processor 130 may store history information for a device that was connected with the electronic device 100 in the memory 120, and control communicative connection with the electronic device 100 based on the history information.

For example, when a request for Bluetooth paring is received, the processor 130 searches a paring list, and determines whether the terminal apparatus 200 is registered in the paring list. That is, the processor 130 determines whether there is history of performing paring with the terminal apparatus 200 previously.

In this case, if there is history of performing paring with the terminal apparatus 200 previously, the processor 130 may perform connection of Bluetooth communication through the terminal apparatus 200 and the communication unit 110.

In contrast, if there is no history of performing paring with the terminal apparatus 200 previously, the processor 130 may check personal identification number (PIN) information, etc., and then perform connection of Bluetooth communication through the terminal apparatus 200 and the communication unit 110.

Meanwhile, the electronic device 100 may perform communication with the terminal apparatus 200 by different methods according to the characteristics of the transportation means 10.

For example, in case the transportation means 10 is implemented as a passenger vehicle, the electronic device 100 may perform communication with the terminal apparatus 200 through a Bluetooth method, and in case the transportation means 10 is implemented as a transportation means used in public transportation like a bus, etc., the electronic device 100 may perform communication with the terminal apparatus 200 through an NFC method.

Meanwhile, the processor 130 may operate multiple operating systems simultaneously by using a hypervisor.

Specifically, the processor 130 may operate a hypervisor, and schedule each operating system such that multiple operating systems are operated simultaneously while sharing the hardware resource of the electronic device 100.

Also, the processor 130 may execute applications in each operating system. For example, the processor 130 may execute an application that is operable in an RTOS in an RTOS, and execute an application that is operable in a GPOS in a GPOS.

In addition, the processor 130 may display screens provided in each operating system on a display (not shown).

Here, the display (not shown) is a component included in the electronic device 100 or in the transportation means 10, and in case the transportation means is implemented as a vehicle, the display may be positioned on a center fascia or attached on a window or a seat. Alternatively, the display may be implemented as a head up display (HUD) in a type of projecting images on a window on the front surface.

For example, the processor 130 may display a screen provided in an RTOS (e.g., a home screen including an object indicating an application executable in an RTOS) and a screen provided by an application executed in an RTOS (e.g., an execution screen of an application, which is a screen including various types of information provided by the executed application), etc. on the display (not shown). Also, the processor 130 may display a screen provided in a GPOS (e.g., a home screen including an object indicating an application executable in a GPOS) and a screen provided by an application executed in a GPOS (e.g., an execution screen of an application, which is a screen including various types of information provided by the executed application), etc. on the display (not shown).

Meanwhile, when a user command is received from the terminal apparatus 200, the processor 130 may control the communication unit 110 to transmit a screen provided by an operating system selected according to the user command among multiple operating systems to the terminal apparatus 200.

For this, the processor 130 may transmit information on the multiple operating systems installed on the electronic device 100 (e.g., the name, logo, etc.) to the terminal apparatus 200 through the communication unit 110.

Specifically, the processor 130 may operate multiple operating systems, and display a screen provided by a first operating system among the multiple operating systems on the display (not shown). In this case, if an application is being executed in the first operating system, the processor 130 may display a screen provided by the application on the display (not shown).

Also, in case an operating system selected according to a user command is a first operating system, the processor 130 may transmit a screen provided by the first operating system to the terminal apparatus 200.

Specifically, when a user command for selecting one of the multiple operating systems is received from the terminal apparatus 200, the processor 130 may determine an operating system selected according to the user command among the multiple operating systems, and transmit a screen image of a screen provided by the selected operating system or a screen provided by an application executed in the selected operating system to the terminal apparatus 200.

In this case, a screen provided by the first operating system or a screen provided by an application executed in the first operating system is being displayed through the display (not shown) of the electronic device 100. Thus, the processor 130 may transmit a screen image of the displayed screen to the terminal apparatus 200. That is, the processor 130 may mirror the displayed screen to the terminal apparatus 200.

Meanwhile, in case a second operating system different from the first operating system is selected according to a user command, the processor 130 may transmit a screen provided by the second operating system to the terminal apparatus 200 while the screen provided by the first operating system is being displayed on the display (not shown).

That is, in case multiple operating systems are operated, one operating system among the multiple operating systems is operated as a foreground, and a screen provided by the operating system is displayed on the display (not shown), and a user command is input, but the other operating systems may be operated as a background.

Accordingly, in case an operating system selected according to a user command received from the terminal apparatus 200 is an operating system operated as a background, the processor 130 may keep displaying a screen provided by an operating system operated as a foreground on the display (not shown), and transmit a screen image of a screen provided by an operating system operated as a background to the terminal apparatus 200.

In this case, if an application is being executed in the second operating system, the processor 130 may transmit a screen image of a screen provided by the application to the terminal apparatus 200.

Meanwhile, the processor 130 may control an operating system according to a user command received from the terminal apparatus 200.

That is, the processor 130 may execute an application in an operating system based on a user command received from the terminal apparatus 200, and transmit a screen provided by the executed application to the terminal apparatus 200.

In this case, the processor 130 may output audio provided by the application through a speaker (not shown). Here, the speaker (not shown) is a component included in the electronic device 100 or the transportation means 10, and may output audio to the inside of the transportation means 10.

Specifically, while a screen image of a screen provided by an operating system or an application is being transmitted to the terminal apparatus 200, if a user command is received from the terminal apparatus 200, the processor 130 may determine a function performed in the operating system or the application according to the user command, and control the operating system or the application to perform a function corresponding thereto.

In this case, the terminal apparatus 200 may transmit data for a touch coordinate value or a key input value to the electronic device 100.

Accordingly, the processor 130 may control the operating system or the application to perform a function corresponding to the touch coordinate value or the key input value received from the terminal apparatus 200.

For example, a case is assumed, wherein a screen provided by an operating system is displayed at the terminal apparatus 200, and here, the screen provided by an operating system includes objects with respect to a plurality of executable applications.

In this case, the processor 130 may determine an object selected by a user through the terminal apparatus 200 on the screen, based on the size of the display (not shown) of the terminal apparatus 200 and the received touch coordinate value, and execute an application with respect to the determined object. Here, information on the size of the display (not shown) of the terminal apparatus 200 may be provided from the terminal apparatus 200. Further, the processor 130 may transmit a screen provided by the executed application to the terminal apparatus 200.

As another example, a case wherein a screen provided by an application is displayed at the terminal apparatus 200 is assumed.

In this case, the processor 130 may perform a function provided by the application (e.g., search of a destination on navigation, etc.) based on the received key input value, and transmit a result screen (e.g., a search screen of a destination on navigation) to the terminal apparatus 200.

Meanwhile, the processor 130 may not transmit audio provided by an operating system or an application to the terminal apparatus 200, but output it through the speaker (not shown).

However, this is merely an example, and the processor 130 may transmit audio provided by an operating system and audio provided by an executed application to the terminal apparatus 200 through the communication unit 110.

Figure 3:
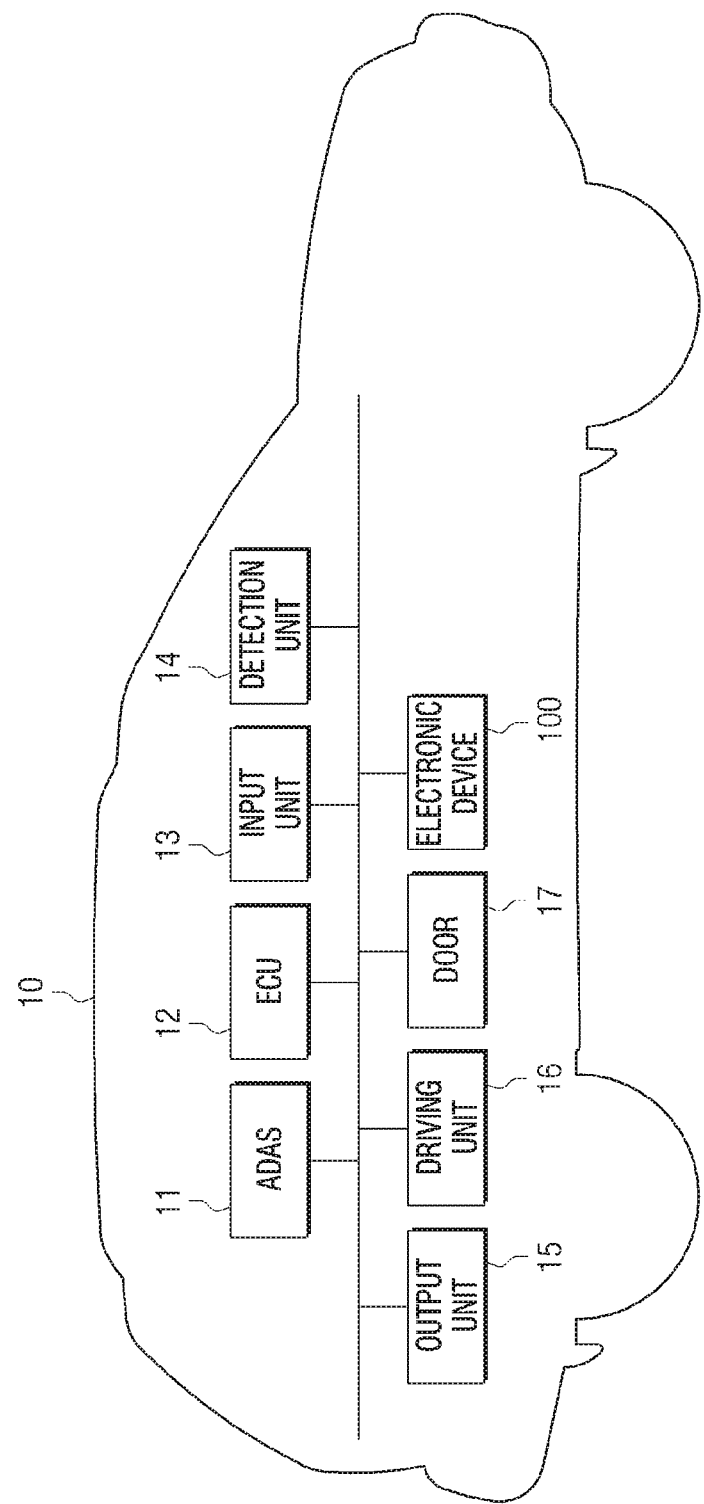
FIG. 3 is a block diagram schematically illustrating a configuration of a transportation means provided with an electronic device according to an embodiment of the disclosure.

FIG. 3 is a block diagram schematically illustrating a configuration of a transportation means provided with an electronic device according to an embodiment of the disclosure.

With respect to FIG. 3, description will be made based on an example wherein the transportation means 10 is implemented as a vehicle.

Referring to FIG. 3, the transportation means 10 includes an electronic device 100 according to an embodiment of the disclosure, and in addition to it, the transportation means 10 may include an ADAS 11 which is a high-tech driving assistance system, an ECU 12 which performs overall control related to operation of the transportation means 10 such as driving/braking/steering, etc. of the transportation means 10, an input unit 13, a detection unit 14, an output unit 15, a driving unit 16 and a door 17.

In FIG. 3, the electronic device 100 was illustrated to be distinguished from the ADAS 11 which is a high-tech driving assistance system and the ECU 12. However, this is merely an example, and according to the various embodiments of the disclosure, at least one of the components of the electronic device 100 may be all or a part of the ADAS 11 or all or a part of the ECU 12.

Meanwhile, the ADAS 11 may be referred to as an assistance system for a driver's driving or a high-tech driving assistance system, and provide various assistance functions related to safety of an automobile.

For example, the ADAS 11 may provide an adaptive cruise control function of recognizing a transportation means in the front side and automatically maintaining safety distance, a smart cruise control function of recognizing distance to a transportation means in the front side and automatically adjusting speed, a traffic jam assist function of maintaining certain distance from a transportation means in the front side in an urban congested area, an adaptive high beam function of alternately operating a high beam and a low beam according to whether it is day or night and whether there is a transportation means coming from the opposite side, a night vision function of detecting an object that is invisible to a driver's eyes in advance using an infrared camera or a thermal image camera and informing the user, a blind spot warning function of searching whether there is a transportation means in a blind spot that is invisible to a driver and informing the user, etc.

The ECU 12 may, for example, detect the state of the transportation means 10, and determine the injected amount of fuel and ignition time, so that the engine of the transportation means 10 may not break down.

For example, the ECU 12 may correct a water temperature sensor, an oxygen sensor, etc. and adjust the opening and closing rate of an injector based on a manifold absolute pressure (MAP) value of ignition time and a MAP value of fuel injection that are determined in advance in consideration of the number of rotations and the intake amount of air, the intake pressure, the degree of openness of the accelerator, etc. of the engine of the transportation means 10.

The input unit 13 may receive various user commands related to control of the transportation means 10, and may be provided on the transportation means 10. For this, the input unit 13 may include a plurality of buttons or a touch screen. In this case, the processor 130 may control the various components of the transportation means 10 such that the transportation means 10 operates according to a user command input through the input unit 13.

The detection unit 14 may detect the surrounding environment of the transportation means 10. For example, the detection unit 14 may include an object detecting sensor or a distance detecting sensor such as a lidar sensor, a radar sensor, an ultrasonic sensor, a vision sensor, an infrared sensor, an LED sensor, etc., for detecting the surrounding environment of the transportation means 10.

In addition to the above, the detection unit 14 may further include at least one sensor among an acceleration sensor, a gyro sensor, an illuminance sensor, a proximity sensor, a pressure sensor, a noise sensor (e.g., a microphone), a video sensor (e.g., a camera module), a temperature sensor, a shock sensor, a tilt sensor, a 3-axis magnetic sensor, a voice recognition sensor, and a timer.

Further, the detection unit 14 may detect information on the state of the battery inside the transportation means 10, information on the state of the fuel, information on the state of the engine (information on the state of the engine, the state of the engine oil, and the state of the timing belt), information on the tires (the degree of abrasion, the degree of distortion, etc. of the tires), information on the driving speed, information on the driving direction, information on steering according to steering rotation, information on the vehicle lamp, information on the temperature and humidity inside the vehicle, information on the tilt of the vehicle, etc. Also, the detection unit 14 may determine whether it is day or night through an illuminance sensor, and the detection unit 14 may also acquire information on illuminance according to the degree of brightness during the day or the direction of the user's gaze.

In this case, the processor 130 may control the various components of the transportation means 10 by using detected information acquired at the detection unit 14 in real time.

The output unit 15 may include a display (not shown) for displaying various screens and a speaker (not shown) for outputting various types of audio.

In this case, the display (not shown) may be positioned on a center fascia or a window or a seat. Alternatively, the display (not shown) may be implemented as a head up display in a type of projecting images on a window on the front surface.

Meanwhile, the display (not shown) and the speaker (not shown) may be components of the electronic device 100.

The driving unit 16 may include a lamp driving unit, a steering driving unit, a brake driving unit, a power supply driving unit, a suspension driving unit, etc., for driving components controlling various types of operations of the transportation means 10 including operation.

Meanwhile, the transportation means 10 may further include a memory (not shown) storing various types of programs and data for controlling the transportation means 10, although it is not illustrated. In this case, at least a portion of the memory (not shown) may be provided separately on the transportation means 10, or included in the ADAS 11 or the ECU 12 of the transportation means 10. Alternatively, a memory 110 provided on the electronic device 100 may store various types of programs and data for controlling the transportation means 10.

Meanwhile, the processor 130 may be connected to various components included in the transportation means 10, and transmit and receive various types of data and signals. Also, the processor 130 may control various components included in a vehicle by generating and transmitting control commands. However, this is merely an example, and a separate processor for controlling various components included in the transportation means 10 may be provided on the transportation means 10.

In this case, the processor 130 may, for example, drive an operating system or an application program and control hardware or software components connected to the processor 130, and perform various types of data processing or operations. Also, the processor 130 may load a command or data received from at least one of different components on a volatile memory and process the command or data, and store various types of data in a non-volatile memory.

For this, the processor 130 may execute a dedicated processor (e.g., an embedded processor) or at least one software program stored in a memory device for performing corresponding operations, and may thereby be implemented as a generic-purpose processor (e.g., a CPU, a GPU, or an application processor) that are capable of performing corresponding operations.

Figure 4:
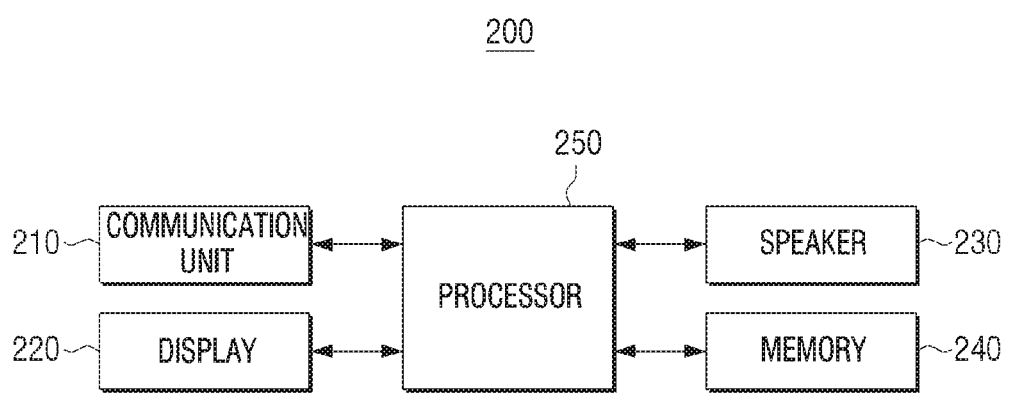
FIG. 4 is a block diagram schematically illustrating a configuration of a terminal apparatus according to an embodiment of the disclosure.

FIG. 4 is a block diagram schematically illustrating a configuration of a terminal apparatus according to an embodiment of the disclosure.

Referring to FIG. 4, the terminal apparatus 200 includes a communication unit 210, a display 220, a speaker 230, a memory 240, and a processor 250.

The communication unit 210 performs communication with the electronic device 100. Specifically, the communication unit 210 may perform communication with the electronic device 100 by using a near field communication module.

For example, the communication unit 210 may perform communication with the electronic device 100 according to a communication standard such as Wi-Fi, Bluetooth, NFC, Zigbee, Picocast, and the like.

The display 220 displays a screen. Specifically, the display 220 may display a screen provided by an operating system and a screen provided by an application. In this case, a screen image of such a screen may be provided from the electronic device 100.

Meanwhile, the display 220 may be implemented as a touch display that may receive a touch, etc. However, this is merely an example, and on the terminal apparatus 200, keys, buttons, etc. may be separately provided for receiving a user command.

The speaker 230 outputs audio. Specifically, the speaker 230 may output audio provided by an operating system and audio provided by an application. In this case, such audio may be provided from the electronic device 100.

The memory 240 stores various types of data necessary for operations of the terminal apparatus 200. For example, the memory 240 may store an operating system, and an application executed in the operating system.

Also, the memory 240 may store a command or data received from the processor 250 or other components (e.g., the communication unit 210, the display 220, the microphone 230, etc.) or generated by the processor 250 or other components.

The processor 250 controls the operations of the terminal apparatus 200. The processor 250 may, for example, drive an operating system or an application program and control hardware or software components connected to the processor 250, and perform various types of data processing or operations. Also, the processor 250 may load a command or data received from at least one of different components on a volatile memory and process the command or data, and store various types of data in a non-volatile memory.

For this, the processor 250 may execute a dedicated processor (e.g., an embedded processor) or at least one software program stored in a memory device for performing corresponding operations, and may thereby be implemented as a generic-purpose processor (e.g., a CPU, a GPU, or an application processor) that are capable of performing corresponding operations.

Meanwhile, the processor 250 may control the communication unit 210 to perform communication with the electronic device 100. Accordingly, the communication unit 210 may perform communication with the electronic device 100 according to a communication standard such as Wi-Fi, Bluetooth, NFC, Zigbee, Picocast, and the like.

In addition, when a user command for selecting one of the multiple operating systems installed on the electronic device 100 is input, the processor 250 may transmit the user command input to the electronic device 100.

Specifically, the processor 250 may request information on the multiple operating systems installed on the electronic device 100 (e.g., the name, logo, etc.) through the communication unit 110, and as a response thereto, receive information on the multiple operating systems installed on the electronic device 100.

Then, the processor 250 may display a list including information on the multiple operating systems installed on the electronic device 100 on the display 230. Afterwards, when one of the multiple operating systems is selected, the processor 250 may transmit information on the selected operating system to the electronic device 100.

Accordingly, when a screen image of a screen provided by an operating system or a screen provided by an application executed in the operating system is received from the electronic device 100, the processor 250 may display the screen provided by an operating system or the screen provided by an application through the display 230 by using the screen image.

Meanwhile, if a user command is input while a screen provided by an operating system or a screen provided by an application is being displayed, the processor 250 may transmit the user command input to the electronic device 100.

Specifically, the processor 250 may transmit data for a touch coordinate value of a point touched on a screen or a key input value input through a virtual keyboard, etc. to the electronic device 100.

Accordingly, the electronic device 100 may perform a function according to the touch coordinate value or the key input value received from the terminal apparatus 200, and transmit a screen image according to the performed function to the terminal apparatus 200.

In this case, when a screen image is received from the electronic device 100, the processor 250 may display the screen image through the display 220.

Meanwhile, if audio provided by an operating system and audio provided by an executed application is received from the electronic device 100, the processor 250 may output the received audio through the speaker 230.

Meanwhile, the aforementioned process may be performed by an application stored in the terminal apparatus 200 (hereinafter referred to as an application controlling an operating system).

That is, when an application controlling an operating system is executed according to a user command, the processor 250 may request information on the operating system installed on the electronic device 100 to the electronic device 100.

Accordingly, when information on multiple operating systems is received from the electronic device 100, the processor 250 may display a list including names for the multiple operating systems on the display 220, and transmit information on an operating system selected through the list to the electronic device 100.

Afterwards, when a screen provided by an operating system or a screen provided by an application being executed is received from the electronic device 100, the processor 250 may display the screen on the display 220.

Meanwhile, in the aforementioned embodiment, it was described that, while the electronic device 100 is operating multiple operating systems, a screen provided by an operating system among the operating systems being operated is provided to the terminal apparatus 200.

Meanwhile, if a user command is received from the terminal apparatus 200 while the electronic device 100 is operating only one operating system, the electronic device 100 may additionally operate an operating system selected according to the user command.

For example, if an operating system determined is an operating system that is currently being operated, the electronic device 100 may transmit a screen provided by the operating system or a screen provided by an application being executed to the terminal apparatus 200.

However, if an operating system determined is not an operating system that is currently being operated, the electronic device 100 may additionally operate the determined operating system, and transmit a screen provided by the operating system to the terminal apparatus 200.

Figure 5:
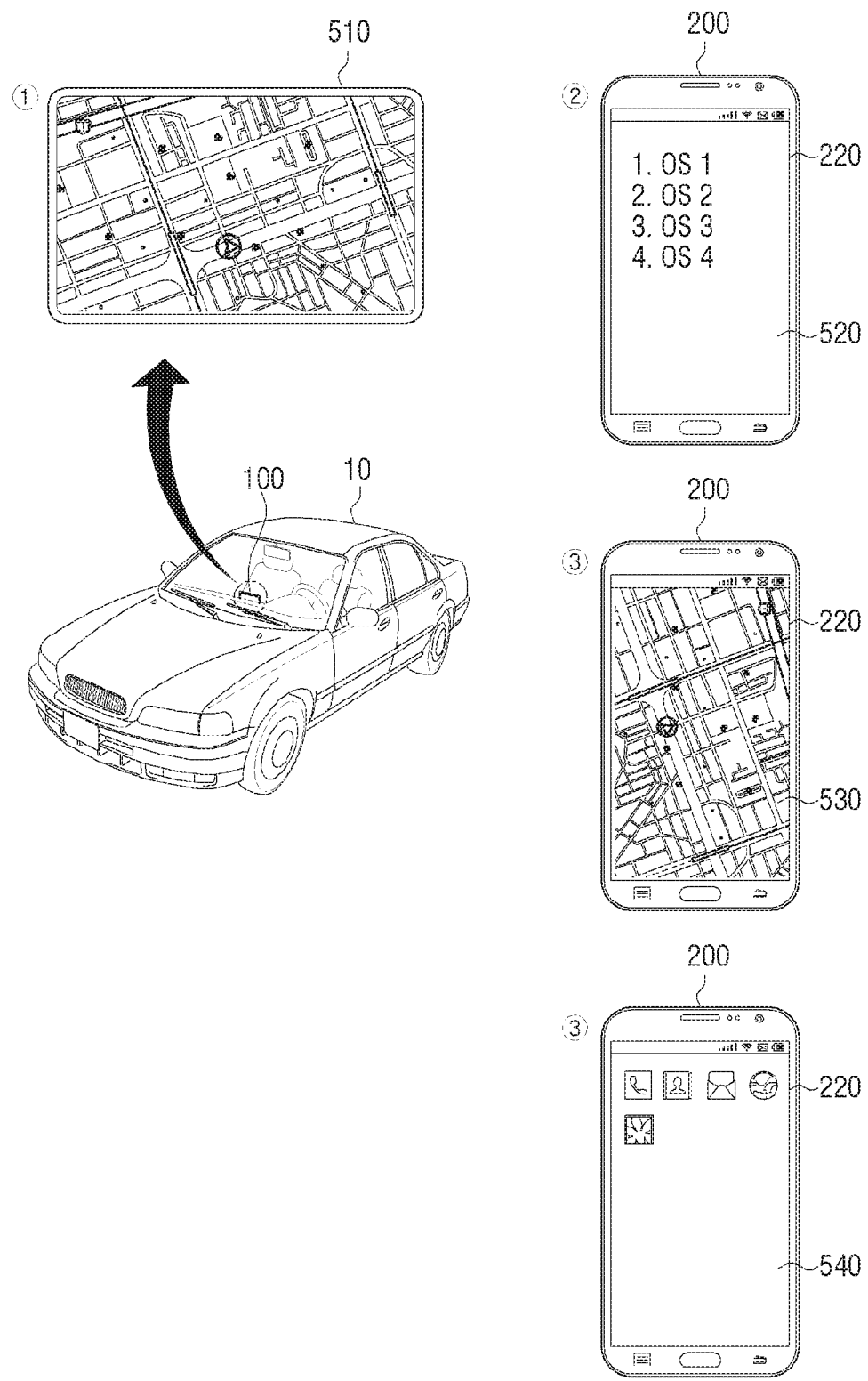
FIG. 5 is a diagram for illustrating a method for controlling an operating system installed on an electronic device at a terminal apparatus according to an embodiment of the disclosure.

FIG. 5 is a diagram for illustrating a method for controlling an operating system installed on an electronic device at a terminal apparatus according to an embodiment of the disclosure.

With respect to FIG. 5, description will be made based on the assumption that the transportation means 10 is implemented as a vehicle.

The electronic device 100 may operate multiple operating systems, and display a screen provided by an application executed in one of the operating systems.

For example, as illustrated in ① of FIG. 5, the electronic device 100 may operate an operating system corresponding to an RTOS among the operating systems being operated, and execute a navigation program in the operating system, and display a navigation screen on the display 510.

Afterwards, when the terminal apparatus 200 is connected to the electronic device 100, the terminal apparatus 200 may display a list for operating systems installed on the electronic device 100. For example, as illustrated in ② of FIG. 5, the terminal apparatus 200 may display a screen 520 including names for the operating system 1 (OS1), operating system 2 (OS2), operating system 3 (OS3), and operating system 4 (OS4) installed on the electronic device 100 on the display 220.

Then, when an operating system is selected on the list, the terminal apparatus 200 may transmit information on the selected operating system to the electronic device 100. Accordingly, the terminal apparatus 200 may receive a screen provided by the selected operating system from the electronic device 100, and display the screen.

For example, as illustrated in ③ of FIG. 5, a case wherein the operating system 1 (OS1) executing a navigation program is selected is assumed.

In this case, the terminal apparatus 200 may receive a navigation screen 530 from the electronic device 100, and display the screen on the display 220.

As another example, as illustrated in ④ of FIG. 5, in case the operating system 2 (OS2) corresponding to a GPOS is selected, the terminal apparatus 200 may receive a home screen including an object indicating an application executable at the operating system 2 (OS2) from the electronic device 100, and display the screen on the display 220.

In the aforementioned embodiments, the terminal apparatus 200 may transmit a user command input to the electronic device 100, and may thereby become capable of controlling an operating system.

According to the various embodiments of the disclosure as described above, even in a situation where it is difficult for a driver to control peripheral devices of a vehicle due to driving, a fellow passenger riding the vehicle can control an operating system installed on the vehicle through a terminal apparatus without interfering with the driver. Accordingly, convenience and safety can be increased. Also, not only an operating system that provides a screen currently displayed on a display of the vehicle, but also other operating systems can be controlled, and thus various contents can be provided. In addition, as a terminal apparatus is provided with a screen for an application installed on the vehicle from an electronic device, an application for a vehicle can also be controlled with a terminal apparatus.

Figure 6:
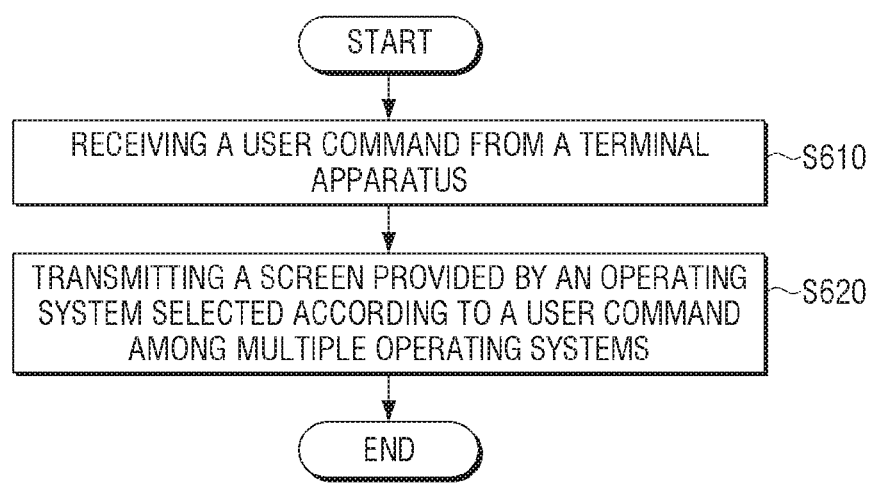
FIG. 6 is a flow chart for illustrating a method for controlling an electronic device according to an embodiment of the disclosure.

FIG. 6 is a flow chart for illustrating a method for controlling an electronic device according to an embodiment of the disclosure.

First, a user command is received from a terminal apparatus at operation S610.

Afterwards, a screen provided by an operating system selected according to a user command among multiple operating systems is transmitted to the terminal apparatus at operation S620. Here, the multiple operating systems may include an RTOS and a GPOS.

In this case, the multiple operating systems may be operated, and a screen provided by a first operating system among the multiple operating systems may be displayed on a display.

Here, at operation S620, in case an operating system selected according to a user command is a first operating system, a screen provided by the first operating system may be transmitted to the terminal apparatus.

Meanwhile, at operation S620, in case a second operating system different from the first operating system is selected according to a user command, a screen provided by the second operating system may be transmitted to the terminal apparatus while the screen provided by the first operating system is being displayed on the display.

Meanwhile, an application may be executed in an operating system selected based on a user command received from the terminal apparatus, and a screen provided by the executed application may be transmitted to the terminal apparatus.

In this case, audio provided by the executed application may be output through a speaker.

Meanwhile, a non-transitory computer readable medium storing a program executing a control method according to the disclosure sequentially may be provided.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Also, in the aforementioned block diagrams illustrating an electronic device and a terminal apparatus, a bus is not illustrated, but communication between each component in an electronic device and a terminal apparatus may be performed through a bus. Also, an electronic device and a terminal apparatus may further include a processor like a CPU and a microprocessor performing the aforementioned various steps.

While the disclosure has been shown and described with reference to preferred embodiments thereof, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic device disposed in a transportation device, the electronic device comprising:
   a display;
   communication circuitry configured to communicate with a terminal apparatus;
   a memory storing a plurality of operating systems; and
   a processor configured to:
      control the display to display a first screen image provided by a first operating system among the plurality of operating systems, based on receiving, from the terminal apparatus, a first user command for displaying a second screen image provided by an application of the electronic device on the terminal apparatus, identify a second operating system among the plurality of operating systems corresponding to the received first user command and execute the application on the identified second operating system while the first screen image provided by the first operating system is maintained on the display, control the communication circuitry to transmit the second screen image which is provided by the application executed on the identified second operating system, to the terminal apparatus, receive a second user command being received from the terminal apparatus while the second screen image is displayed on the terminal apparatus, and control an operation of the application based on the second user command while the first screen image provided by the first operating system is maintained on the display.

2. The electronic device of claim 1, wherein the processor is further configured to, based on the operating system selected according to the first user command being the first operating system, transmit the first screen image provided by the first operating system to the terminal apparatus.

3. The electronic device of claim 1, wherein the processor is further configured to output audio provided by the executed application through a speaker.

4. The electronic device of claim 1, wherein the plurality of operating systems include a real-time operating system (RTOS) and a general purpose operating system (GPOS).

5. A method for controlling an electronic device disposed in a transportation device, the method comprising:

displaying a first screen image provided by a first operating system among the plurality of operating systems, based on receiving, from a terminal apparatus, a first user command for displaying a second screen image provided by an application of the electronic device on the terminal apparatus, identifying a second operating system among a plurality of operating systems corresponding to the received first user command and execute the application on the identified second operating system while the first screen image provided by the first operating system is maintained on the display;

transmitting the second screen image, which is provided by the application executed on the identified second operating system, to the terminal apparatus;

receiving a second user command being received from the terminal apparatus while the second screen image is displayed on the terminal apparatus; and controlling an operation of the application based on the second user command while the first screen image provided by the first operating system is maintained on the display.

6. The method of claim 5, wherein the transmitting comprises:

based on the operating system selected according to the first user command being the first operating system, transmitting the first screen image provided by the first operating system to the terminal apparatus.

7. The method of claim 5, further comprising: outputting audio provided by the executed application through a speaker.

8. The method of claim 5, wherein the plurality of operating systems include a real-time operating system (RTOS) and a general purpose operating system (GPOS).

9. The method of claim 5, based on the first user command identifying an operating system that is not currently being operated on the electronic device, operating the identified operating system.

* * * * *